Oct. 8, 1940.   C. SCHMIDT   2,216,988
DEPTH STOP FOR COUNTERSINKING, BORING, DRILLING, AND SIMILAR DEVICES
Filed Sept. 30, 1938
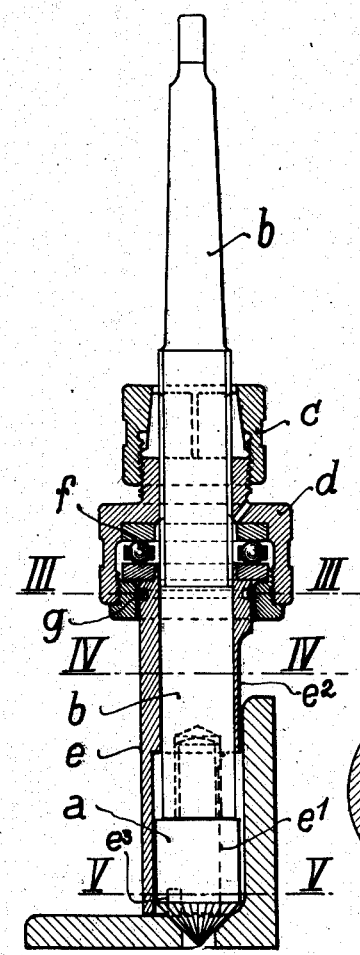
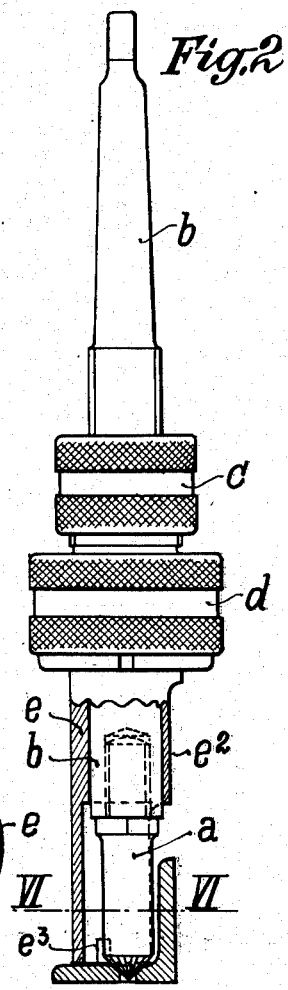
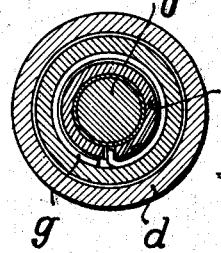
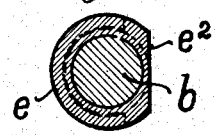
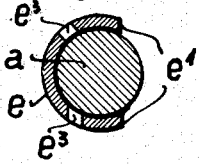
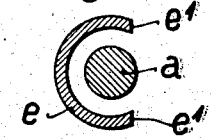
Inventor:
Carl Schmidt
by S. Sokal
Attorney.

Patented Oct. 8, 1940

2,216,988

UNITED STATES PATENT OFFICE 2,216,988

DEPTH STOP FOR COUNTERSINKING, BORING, DRILLING, AND SIMILAR DEVICES

Carl Schmidt, Hamburg, Germany, assignor to Werner Roterberg, Dusseldorf, Germany Application September 30, 1938, Serial No. 232,620
In Germany October 7, 1937

2 Claims. (Cl. 77—55)

This invention relates to improvements in and relating to devices for countersinking, boring, drilling and similar operations and more particularly to depth stops therefor.

In devices of this kind in which the depth stop is adjustable in height and rotatable independently of the said adjustment, account has to be taken of the fact that borings or shavings become lodged in the space between the countersinking or other tool and the tubular depth stop, with resulting jamming of the sleeve. On the other hand the depth stop must be so made that it does not impede the working even when bulky tools are used and, moreover, so that the countersinking or other operation can be watched.

According to this invention, therefore, in a depth stop of the kind above referred to, the stop sleeve is provided with a segmental cut-out portion or recess extending to the lower end of the sleeve and leaving the tool free.

Moreover, the sleeve is advantageously flattened on one side so as to enable working to be effected directly adjacent vertical walls. A relatively long sleeve, constructed in this manner, is also stressed by lateral pressure such that the thrust bearing provided thereon is not sufficient to ensure an easy running of the spindle, so that in the said guide bearing, a spring ring is advantageously arranged for the purpose of lessening the lateral friction.

In order that the invention may be fully understood, I shall now describe one embodiment thereof, by way of example, by reference to the accompanying drawing, in which—

Fig. 1 is a longitudinal section of a device constructed in accordance with the invention and having the largest possible countersinking tool fitted therein.

Fig. 2 is a part sectional elevation of the device but showing a small countersinking tool, Fig. 3 is a section on the line III—III of Fig. 1, Fig. 4 is a section on the line IV—IV of Fig. 1, Fig. 5 is a section on the line V—V of Fig. 1, and Fig. 6 is a section on the line VI—VI of Fig. 2.

The spindle $b$, receiving the countersinking tool $a$ is provided with a thread for the casing $d$ which is fixable at the required height by means of a clamping nut $c$ or the like, and is arranged as a bearing for the stop sleeve $e$. The said sleeve $e$ is supported in the casing $d$ axially against a ball thrust-bearing $f$, whilst as a lateral bearing, for example as shown, a spring ring $g$, carried in a groove, is provided, whereby the lateral friction is very considerably reduced and a jamming owing to radial stresses is avoided.

In order, on the one hand, to be able to observe the countersinking tool and rapidly introduce it into the hole to be worked and, on the other hand, to be able to work directly adjacent vertical walls or the like, the sleeve $e$ is provided with a cutout portion $e^1$ extending to the lower end of the sleeve and leaving the countersinking tool free, the cut-out portion being formed as a segmental cut extending as far as the flattened part $e^2$. The cut-out portion $e^1$ is so dimensioned that the smallest tool used is flush or level with it (Figure 2) and the flattened part $e^2$ corresponds to the diameter of the largest tool (Figure 1).

Moreover, on the rear face of the sleeve $e$, chip- or boring-removing grooves $e^3$ are arranged, which, running approximately tangentially, serve in conjunction with the lower edges of the cut-out portion $e^1$ to remove the borings lying on the tool both on the raising of the sleeve $e$ as well as during operating, that is during the lowering thereof.

The construction of the sleeve $e$ also enables non-rotatable stop-sleeves to be employed.

I claim:

1. A depth stop for countersinking, boring, drilling and similar tools including a tool receiving spindle, a sleeve surrounding the spindle and rotatable relative thereto, said sleeve having at one side thereof a segmental cut-out portion extending to the lower end thereof and being so dimensioned, that, when said stop is in position on said tool, the side edges of the cut-out portion of said sleeve aline with the outer periphery of the smallest tool employed; said sleeve also being formed with a flattened face above said cut-out portion, said flattened face adapted to aline with the periphery of the largest tool employed.

2. A depth gauge for countersinking, boring, drilling and similar tools, including, in combination, a spindle having a socket for receiving a tool, an annular cup-like casing receiving said spindle and having an offset threaded neck and gripping fingers, a clamping nut engageable with said nut and fingers to lock the casing at a selected point longitudinally of said spindle, a bearing in said cup-like casing, a sleeve having its upper end engaged with said bearing and rotatable relative to said spindle and casing, said sleeve having a portion of its outer surface formed to provide a flattened face, and also having the portion below said flattened face cut away to provide an opening at one side of the sleeve, said flattened face being so dimensioned relative to the axis of the sleeve as to lie in the plane of the periphery of the largest tool adapted to fit in the spindle, and the edges of the cut-away portion of the sleeve being located relative to the axis of the spindle so as to lie in the plane of the outer periphery of the smallest tool adapted to be employed with the spindle.

CARL SCHMIDT.